United States Patent
Mangrum

(10) Patent No.: US 7,106,492 B2
(45) Date of Patent: Sep. 12, 2006

(54) BIAS VOLTAGE ROUTING SCHEME FOR A DIGITAL MICRO-MIRROR DEVICE

(75) Inventor: Brett A. Mangrum, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 77 days.

(21) Appl. No.: 11/019,066

(22) Filed: Dec. 21, 2004

(65) Prior Publication Data

US 2006/0132890 A1    Jun. 22, 2006

(51) Int. Cl.
*G02B 26/00* (2006.01)
*G02B 26/08* (2006.01)
*G02F 1/29* (2006.01)

(52) U.S. Cl. ............ 359/291; 359/292; 359/295; 359/298

(58) Field of Classification Search ........ 359/290, 359/291, 292, 295, 298
See application file for complete search history.

(56) References Cited

U.S. PATENT DOCUMENTS

| | | | | |
|---|---|---|---|---|
| 5,535,047 A | * | 7/1996 | Hornbeck | 359/295 |
| 5,610,624 A | * | 3/1997 | Bhuva | 345/84 |
| 5,771,116 A | * | 6/1998 | Miller et al. | 359/295 |
| 5,943,157 A | * | 8/1999 | Florence et al. | 359/290 |
| 6,028,690 A | * | 2/2000 | Carter et al. | 359/224 |
| 6,038,056 A | * | 3/2000 | Florence et al. | 359/290 |
| 6,147,790 A | * | 11/2000 | Meier et al. | 359/291 |
| 6,618,186 B1 | * | 9/2003 | Kaeriyama | 359/292 |

* cited by examiner

*Primary Examiner*—David N. Spector
(74) *Attorney, Agent, or Firm*—Charles A. Brill; Wade James Brady, III; Frederick J. Telecky, Jr.

(57) ABSTRACT

An apparatus for use with a digital micro-mirror includes a hinge disposed outwardly from a substrate and capable of at least partially supporting a micro-mirror disposed outwardly from the hinge. The micro-mirror capable of being selectively transitioned between an on-state position and an off-state position based at least in part on a bias voltage received by a conductive conduit. The apparatus also includes a conductive layer disposed inwardly from the at least one micro-mirror. In one particular embodiment, the conductive layer enables a conductive path for the bias voltage substantially inwardly from a periphery of the micro-mirror.

20 Claims, 2 Drawing Sheets

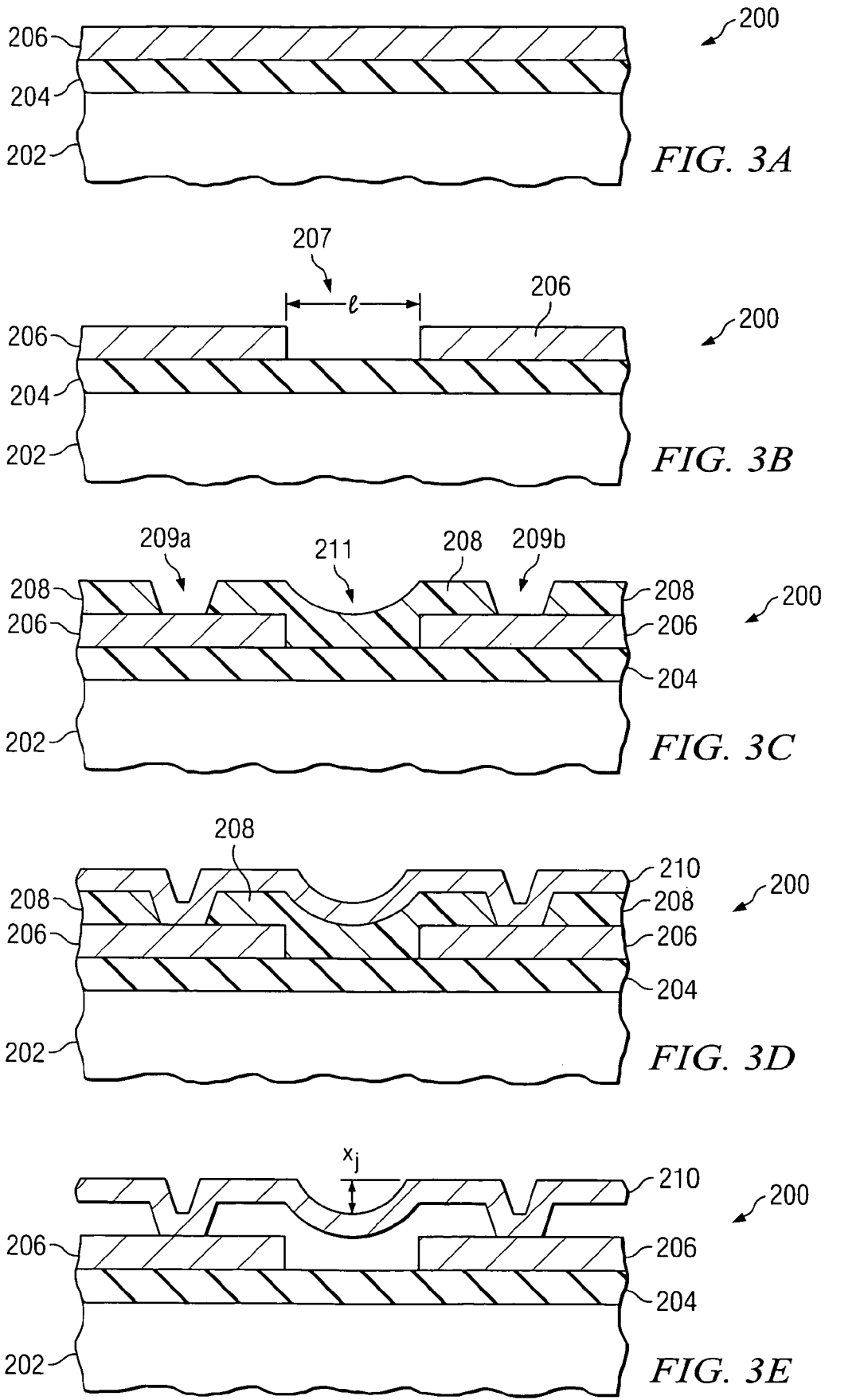

BIAS VOLTAGE ROUTING SCHEME FOR A DIGITAL MICRO-MIRROR DEVICE

TECHNICAL FIELD OF THE INVENTION

This invention relates in general to spatial light modulators and, in particular, to an apparatus capable of routing a bias voltage around a perimeter of a pixel and method of manufacturing the same.

BACKGROUND

Digital micro-mirror devices (DMD) are capable of being used in optical communication and/or projection display systems. DMDs involve an array of micro-mirrors that selectively communicate at least a portion of an optical signal or light beam. DMDs selectively communicate an optical signal or light beam by pivoting between active "on" and "off" states. To permit the micro-mirrors to pivot, each micro-mirror is attached to a hinge that is mounted on one or more support posts. In addition, a conductive layer associated with each micro-mirror receives a bias voltage that is capable of at least partially creating the electro-static forces necessary to transition each micro-mirror between the active "on" and "off" states.

Conventional DMDs typically route the bias voltage associated with the DMD underneath the hinge associated with each micro-mirror. Routing the bias voltage under the hinge of the DMD typically requires the formation of a conductive channel under the hinge. In addition, conventional DMDs typically cause stray light reflections around the periphery of the micro-mirror, which can degrade the contrast ratio of the device.

SUMMARY

In one embodiment, an apparatus for use with a digital micro-mirror comprises a hinge disposed outwardly from a substrate. The hinge capable of at least partially supporting a micro-mirror disposed outwardly from the hinge. The micro-mirror capable of being selectively transitioned between an on-state position and an off-state position based at least in part on a bias voltage received by a conductive conduit. The apparatus also comprises a conductive layer disposed inwardly from the at least one micro-mirror. In one particular embodiment, the conductive layer enables a conductive path for the bias voltage substantially inwardly from a periphery of the micro-mirror.

In a method embodiment, a method of forming an apparatus for use with a digital micro-mirror comprises forming a hinge disposed outwardly from a substrate. The hinge capable of at least partially supporting a micro-mirror disposed outwardly from the hinge. The method also comprises forming a hinge void within a conductive layer. The hinge void is disposed inwardly from the hinge, where the hinge void is substantially free from conductive materials. The method further comprises routing a bias voltage substantially inwardly from a periphery of the micro-mirror.

Depending on the specific features implemented, particular embodiments of the present invention may exhibit some, none, or all of the following technical advantages. Various embodiments may be capable of routing a bias voltage substantially around the periphery of a conductive layer associated with the device. Some embodiments may be capable of improving the contrast ratio of the digital micro-mirror device. Other embodiments may be capable of selectively controlling a hinge profile during formation of the device.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIGS. 3A through 3E are cross sectional views illustrating one example of a method of forming a portion of a digital micro-mirror device.

DETAILED DESCRIPTION OF EXAMPLE EMBODIMENTS

Figure 1:
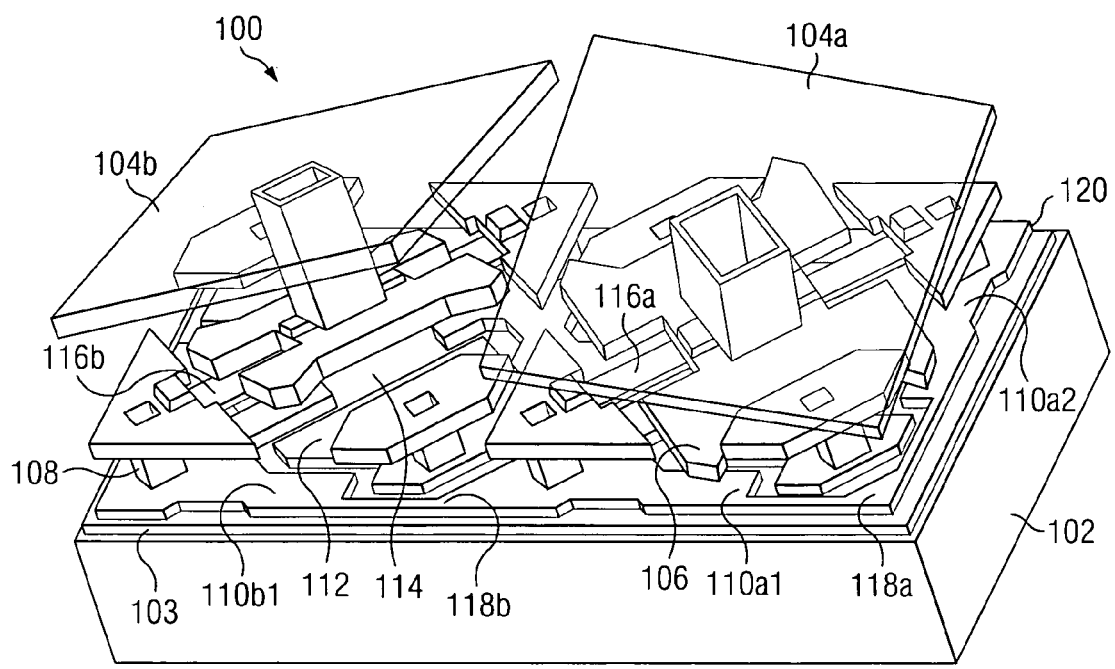
FIG. 1 is a perspective view of one embodiment of a portion of a digital micro-mirror device.

FIG. 1 is a perspective view of one embodiment of a portion of a digital micro-mirror device (DMD) 100. In this example, DMD 100 comprises a micro electro-mechanical switching (MEMS) device that includes an array of hundreds of thousands of tilting micro-mirrors 104. In this example, each micro-mirror 104 is approximately 13.7 square microns in size and has an approximately one micron gap between adjacent micro-mirrors. In some examples, each micro-mirror can be less than thirteen square microns in size. In other examples, each micro-mirror can be approximately seventeen square microns in size. In addition, each micro-mirror 104 may tilt up to plus or minus ten degrees creating an active "on" state condition or an active "off" state condition. In other examples, each micro-mirror 104 may tilt plus or minus twelve degrees for the active "on" state or "off" state.

In this example, each micro-mirror 104 transitions between its active "on" and "off" states to selectively communicate at least a portion of an optical signal or light beam. To permit micro-mirrors 104 to tilt, each micro-mirror 104 is attached to one or more hinges 116 mounted on support posts 108, and spaced by means of an air gap over a complementary metal-oxide semiconductor (CMOS) substrate 102. In this example, micro-mirrors 104 tilt in the positive or negative direction until yoke 106 contacts conductive conduits 110. Although this example includes yoke 106, other examples may eliminate yoke 106. In those examples, micro-mirrors 104 tilt in the positive or negative direction until micro-mirrors 104 contact a mirror stop (not explicitly shown).

In this particular example, electrodes 112 and conductive conduits 110 are formed within a conductive layer 120 disposed outwardly from oxide layer 103. Conductive layer 120 can comprise, for example, an aluminum alloy or other suitable conductive material. Oxide layer 103 operates to insolate CMOS substrate 102 from electrodes 112 and conductive conduits 110.

Conductive layer 120 operates to receive a bias voltage that at least partially contributes to the creation of the electrostatic forces necessary to transition each micro-mirror between the active "on" and "off" states. In this particular example, the bias voltage comprises a steady-state voltage. That is, the bias voltage applied to conductive layer 120 remains substantially constant while DMD 100 is in operation. In this example, the bias voltage comprises approximately twenty-six volts. Although this example uses a bias voltage of twenty-six volts, other bias voltages may be used without departing from the scope of the present disclosure.

In this particular example, CMOS substrate 102 comprises the control circuitry associated with DMD 100. The control circuitry can comprise any hardware, software, firmware, or combination thereof capable of at least partially contributing to the creation of electrostatic forces between electrodes 112, micro-mirrors 104, and/or yoke 106. The control circuitry associated with CMOS substrate 102 functions to selectively transition micro-mirrors 104 between "on" state and "off" state based at least in part on data received from a processor (not explicitly shown). The control circuitry transitions micro-mirrors 104 between "on" and "off" states by selectively applying a control voltage to one of two electrodes 112 associated with a particular micro-mirror 104. In this example, the control voltage comprises approximately three volts. Although this example uses a control voltage of approximately three volts, other bias voltages may be used without departing from the scope of the present disclosure.

Conventional DMDs typically route a bias voltage associated with the DMD underneath a hinge, such as hinge 116, associated with each micro-mirror. The terms "underneath" and/or "under" refer to the proximity of a component in relation to another component of the DMD and are not intended to limit the orientation of the device and/or components. Routing the bias voltage under the hinge of the DMD necessitates the formation of a conductive channel under the hinge. In most cases, the conductive channel includes a material whose reflective properties are less reflective than the material residing inwardly from the conductive channel. In addition, conventional DMDs typically cause stray light reflections around the periphery of the micro-mirror, which can degrade the contrast ratio of the device.

Figure 2:
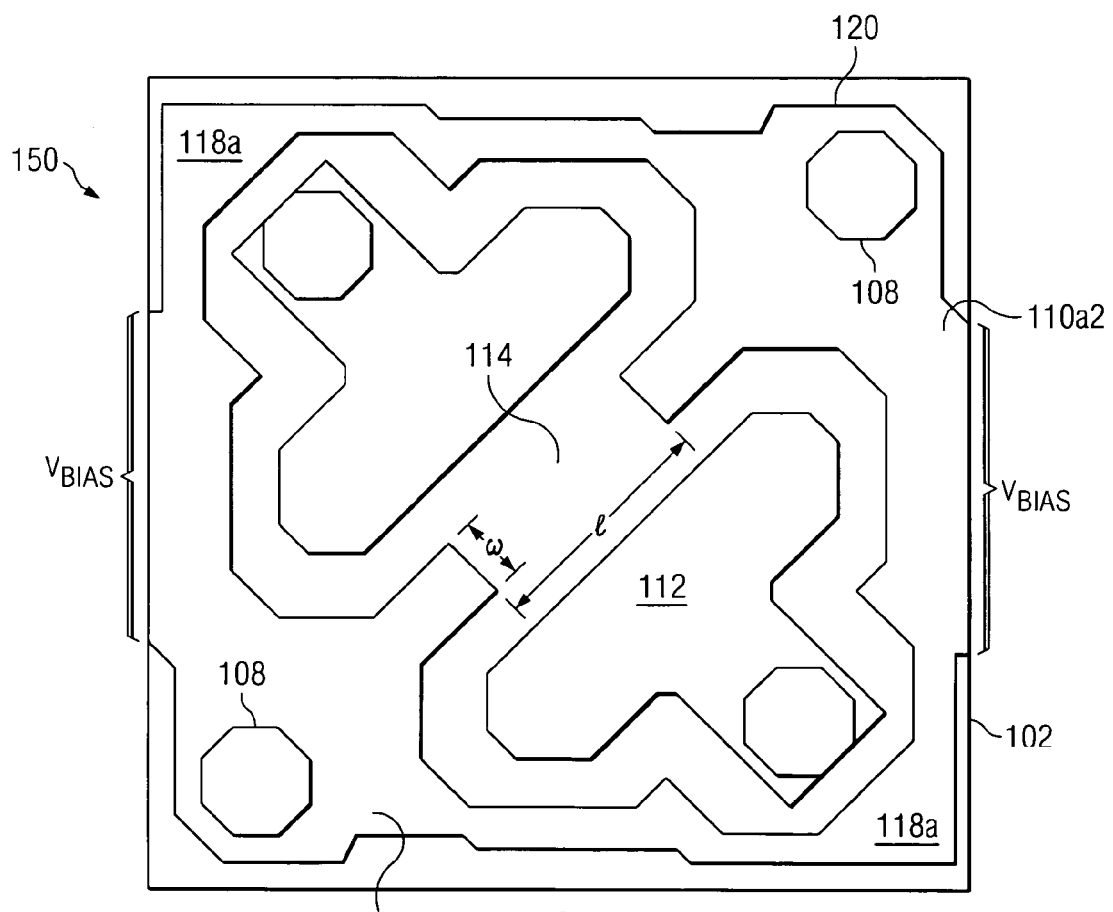
FIG. 2 is a top view of a partially formed digital micro-mirror pixel.

Unlike, conventional DMDs, DMD 100 routes the bias voltage substantially around the periphery of at least a portion of conductive layer 120 (shown best in FIG. 2). In this example, conductive conduit 110$a_1$ associated with micro-mirror 104$a$ is interconnected with conductive conduit 110$a_2$ at least through channel 118$a$. In addition, conductive conduit 110$a_1$ associated with micro-mirror 104$a$ is interconnected with conductive conduit 110$b_1$ associated with micro-mirror 104$b$ through channel 118$b$. In this example, channels 118 are formed within conductive layer 120. Interconnecting conductive conduits 110 can allow DMD 100 to route the bias voltage substantially under the periphery of each micro-mirror disposed outwardly from conductive layer 120. The bias voltage is routed through the interconnected conductive conduits 110 via channels 118, resulting in the bias voltage being routed substantially under the periphery of micro-mirrors 104. Interconnected conductive conduits 110 formed underneath the periphery of micro-mirrors 104 can also result in an increase in the contrast ratio associated with DMD 100 because of the distribution of reflective material under the periphery of micro-mirror 104.

One aspect of this disclosure recognizes that by routing the bias voltage under the periphery of each micro-mirror 104 device manufactures can improve the manufacturability and device performance of DMD 100 by forming a hinge void 114 under hinge 116. In most cases, hinge void 114 can be formed within conductive layer 120 by removing a desired length, and substantially all a width and depth or thickness associated with the portion of conductive layer 120 disposed under hinge 116.

FIG. 2 is a cut-away view of a portion of a micro-mirror assembly 150 associated with a DMD. In FIG. 2, elements that are substantially similar in structure and function to elements in FIG. 1 have the same reference numerals. In this example, assembly 150 includes support posts 108, conductive conduits 110, electrodes 112, hinge void 114, and channels 118.

In this particular embodiment, conductive conduits 110, electrodes 112, and channels 118 are formed within a conductive layer 120 disposed outwardly from substrate 102. Channels 118 operate to interconnect conductive conduit 110$a_1$ with conductive conduit 110$a_2$. Interconnecting conductive conduits 110$a_1$ and 110$a_2$ allow a bias voltage ($V_{bias}$) associated with micro-mirror assembly 150 to be routed substantially around the periphery of conductive layer 120. As indicated above, the formation of the interconnected conductive conduits 110 can improve the contrast ratio of the DMD. In some cases, the interconnected conductive conduits can improve the contrast ratio by, for example, five percent (5%), ten percent (10%), twenty percent (20%), or more over conventional DMDs.

In addition, the interconnected conductive conduits 110 advantageously allow a device manufacturer to form hinge void 114 within assembly 150. Hinge void 114 is capable of substantially preventing the bias voltage ($V_{bias}$) from being routed under a hinge (not explicitly shown) associated with assembly 150. In this example, hinge void 114 is formed by removing substantially all of a width (w) and thickness for a desired length (l) associated with the portion of conductive layer 120 disposed under the hinge.

In operation, micro-mirror assembly 150 receives a bias voltage ($V_{bias}$) from an adjacent micro-mirror assembly associated with the DMD. Micro-mirror assembly 150 routes the bias voltage ($V_{bias}$) in a conductive path substantially around the periphery of conductive layer 120. That is, assembly 150 routes the received bias voltage ($V_{bias}$) through interconnected conductive conduits 110 via channels 118 resulting in the bias voltage ($V_{bias}$) being routed substantially around the periphery of conductive layer 120. In this example, micro-mirror assembly 150 communicates the bias voltage ($V_{bias}$) to an adjacent micro-mirror assembly.

FIGS. 3A through 3E are cross sectional views illustrating one example of a method of forming a portion of a digital micro-mirror device (DMD) 200. DMD 200 may be used as a basis for forming any of a variety of optical devices, such as a spatial light modulator, a gain equalizer, an optical filter, or combination of these or other optical devices. Particular examples and dimensions specified throughout this document are intended for example purposes only, and are not intended to limit the scope of the present disclosure. Moreover, the illustration in FIGS. 3A through 3E are not intended to be to scale.

FIG. 3A shows a cross sectional view of DMD 200 after formation of a inter-level oxide layer (ILO) 204 disposed outwardly from a substrate 202 and after formation of a conductive layer 206 outwardly from inter-level oxide layer 204. Although substrate 202 and inter-level oxide layer 204 are shown as being formed without interstitial layers between them, such interstitial layers could alternatively be formed without departing from the scope of the present disclosure. Substrate 202 may comprise any suitable material used in semiconductor chip fabrication, such as silicon, poly-silicon, indium phosphide, germanium, or gallium arsenide. In various embodiments, substrate 202 can include complementary metal-oxide semiconductor (CMOS) circuitry capable of controlling DMD 200 after its formation.

Inter-level oxide layer 204 may comprise, for example, oxide, silicon dioxide, or oxi-nitride. Forming inter-level oxide layer 204 may be affected through any of a variety of processes. In one non-limiting example, inter-level oxide layer 204 can be formed by growing an oxide. Using a grown oxide as inter-level oxide layer 204 can advantageously provide a mechanism for removing surface irregularities in substrate 202. For example, as oxide is grown on the surface of substrate 202, a portion of substrate 202 is consumed, including at least some of the surface irregularities.

Conductive layer 206 may comprise, for example, an aluminum alloy or other conductive material. Where conductive layer 206 comprises an aluminum alloy, the aluminum alloy may comprise, for example, aluminum, silicon, polysilicon, tungsten, nitride, and/or a combination of these or other conductive materials. In this example, conductive layer 206 comprises silicon-based aluminum that has light absorbing and/or anti-reflective properties. In other embodiments, conductive layer 206 may include an anti-reflective material disposed outwardly from the silicon-based aluminum layer. Forming conductive layer 206 may be affected, for example, by depositing silicon-based aluminum. Although inter-level oxide layer 204 and conductive layer 206 are shown as being formed without interstitial layers between them, such interstitial layers could alternatively be formed without departing from the scope of the present disclosure.

FIG. 3B shows a cross sectional view of DMD 200 after formation of a hinge void 207 outwardly from inter-level oxide layer 204 and within conductive layer 206. Forming hinge void 207 may be affected through any of a variety of processes. For example, hinge void 207 may be formed by removing a substantially all of a portion of conductive layer 206. In this particular embodiment, hinge void 207 is formed by patterning and etching conductive layer 206 using photo resist mask and etch techniques.

Forming hinge void 207 in conductive layer 206 can allow a DMD device manufacturer to prevent a bias voltage from being routed under a hinge (to be formed later) associated with DMD 200. In this example, hinge void 207 is formed by removing substantially all of a width (not explicitly shown) and a thickness (t) for a desired length (l) associated with the portion of conductive layer 206 to be disposed under the hinge. As indicated above, the formation of hinge void 207 can improve the contrast ratio of the DMD.

In addition, forming hinge void 207 in conductive layer 206 can allow a DMD device manufacturer to control a profile of a hinge formed during a subsequent process step. Hinge void 207 may comprise any length (l) suitable to support a desired hinge profile. In various embodiments, the length (l) of hinge void 207 may comprise, for example, a length of 13.8 microns or less. Hinge void 207 may comprise any dimension selected to accommodate a chosen hinge profile without departing from the scope of the present disclosure.

At some point, the interconnected conductive conduits, electrodes, and channels (not explicitly shown) associated with DMD 200 are formed within conductive layer 206. Forming the interconnected conductive conduits, electrodes, and channels may be affected through any of a variety of processes. For example, the interconnected conductive conduits, electrodes, and channels may be formed by removing a portion of conductive layer 206. In this particular embodiment, the interconnected conductive conduits, electrodes, and channels are formed by patterning and etching conductive layer 206 using photo resist mask and etch techniques. In some cases, the interconnected conductive conduits, electrodes, and channels can be formed substantially simultaneously with hinge void 207. In other embodiments, the interconnected conductive conduits, electrodes, and channels can be formed before or after the formation of hinge void 207. In various embodiments, the interconnected conductive conduits, electrodes, and channels formed in conductive layer 206 can be substantially similar in structure and function as conductive conduits 110, electrodes 112, and channels 118 of FIGS. 1 and 2.

FIG. 3C shows a cross sectional view of DMD 200 after formation of a spacer layer 208 outwardly from inter-level oxide layer 204 and after formation of hinge post cavities 209a and 209b within spacer layer 208. Although spacer layer 208 and conductive layer 206 are shown as being formed without interstitial layers between them, such interstitial layers could alternatively be formed without departing from the scope of the present disclosure. Spacer layer 208 may comprise, for example, a photoresist material or other selectively etchable material. That is, spacer layer 208 can be removed using an etchant that does not significantly affect other materials.

Forming spacer layer 208 may be affected through any of a variety of processes. For example, spacer layer 208 can be formed by depositing or spinning-on a photo-resist material. In the illustrated embodiment, spacer layer 208 comprises a material that is selectively etchable from conductive layer 206 and/or inter-level oxide layer 204. That is, each of spacer layer 208 and conductive layer 206 and/or inter-level oxide layer 204 can be removed using an etchant that does not significantly affect the other.

In this example, the formation of spacer layer 208 results in at least a portion of spacer layer 208 having a contour 211. Contour 211 depends at least in part on the length (l) associated with hinge void 207. In some cases, controlling hinge void length (l), deposition rate, and/or other process parameters can allow a DMD device manufacturer to control contour 211. Controlling contour 211 can advantageously allow DMD device manufacturers to form a desired hinge profile.

Forming hinge post cavities 209a and 209b may be affected through any of a variety of processes. For example, hinge post cavities 209a and 209b can be formed by patterning and etching spacer layer 208.

FIG. 3D shows a cross sectional view of DMD 200 after formation of a hinge layer 210 outward from spacer layer 208. Although spacer layer 208 and hinge layer 210 are shown as being formed without interstitial layers between them, such interstitial could alternatively be formed without departing from the scope of the present disclosure. Hinge layer 210 may comprise, for example, aluminum, silicon, polysilicon, tungsten, nitride, and/or a combination of these or other materials. In this example, hinge layer 210 comprises an aluminum alloy that has reflective properties. In other examples, hinge layer 210 could comprise an aluminum compound that has light absorbing and/or anti-reflective properties. Forming hinge layer 210 may be affected, for example, by depositing an aluminum alloy. In this example, the formation of hinge layer 210 results in at least a portion of hinge layer 210 having a contour 213. In this particular example, contour 213 is substantially similar to contour 211.

FIG. 3E shows a cross sectional view of DMD 200 after removal of spacer layer 208 and subjecting DMD 200 to a final anneal. Spacer layer 208 can be removed by any of a number of processes, such as, for example, by performing an isotropic plasma etch. Although this example illustrates the removal of spacer layer 208 after depositing hinge layer 210 without any additional process steps, such additional process steps could alternatively be performed without departing from the scope of the present disclosure.

In various examples, after the removal of spacer layer 208 DMD 200 is subject to a final anneal. In some cases, the final anneal step can be performed between one-hundred degrees Celsius and two-hundred degrees Celsius. The final anneal temperature being based at least in part on an anneal time necessary to activate the device.

In some cases, controlling hinge void length (l), deposition rate, and/or other process parameters can allow a DMD device manufacturer to control contour 211. Controlling contour 211 can advantageously allow DMD device manufacturers to form a desired hinge profile.

In this particular embodiment, hinge 210 comprises a sag $(X_j)$. The amount of sag $(X_j)$ of hinge 210 depends at least in part on the length (l) associated with hinge void 207. Reducing the hinge void length (l) of hinge void 207 typically results in shallower hinge sag $(X_j)$ within hinge 210 after final anneal. In some cases, hinge sag $(X_j)$ can substantially minimize the formation of raised popped micro-mirrors.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An apparatus for use with a digital micro-mirror, comprising:
    a hinge disposed outwardly from a substrate and capable of at least partially supporting a micro-mirror disposed outwardly from the hinge, the micro-mirror capable of being selectively transitioned between an on-state position and an off-state position based at least in part on a bias voltage received by a conductive layer;
    a hinge void disposed inwardly from the hinge; and
    a plurality of interconnected conductive conduits formed within the conductive layer and disposed inwardly from the micro-mirror, wherein the plurality of interconnected conductive conduits enable a conductive path for the bias voltage substantially inwardly from a periphery of the micro-mirror.

2. The apparatus of claim 1, wherein the substrate comprises a CMOS substrate.

3. The apparatus of claim 1, wherein the substrate comprises control circuitry capable of selectively transitioning the micro-mirror between an on-state position and an off-state position.

4. The apparatus of claim 1, wherein the hinge void is substantially free from conductive materials.

5. The apparatus of claim 1, wherein the hinge void comprises a width and a thickness over a desired length associated with at least some of the conductive layer disposed inwardly from the hinge.

6. The apparatus of claim 1, wherein the conductive layer further comprises at least one channel interconnecting at least two of the plurality of conductive conduits.

7. A method of forming an apparatus for use with a digital micro-mirror, comprising:
    forming a hinge disposed outwardly from a substrate, the hinge capable of at least partially supporting a micro-mirror disposed outwardly from the hinge; and
    forming a hinge void within a conductive layer, the hinge void disposed inwardly from the hinge, wherein the hinge void is substantially free from conductive materials; and
    routing a bias voltage substantially inwardly from a periphery of the micro-mirror.

8. The method of claim 7, wherein the substrate comprises a material selected from the group consisting of silicon, poly-silicon, indium phosphide, germanium, and gallium arsenide.

9. The method of claim 7, wherein forming the hinge void comprises removing substantially all of a width and a thickness over a desired length associated with at least some of the conductive layer disposed inwardly from the hinge.

10. The method of claim 7, wherein the conductive layer comprises an aluminum alloy comprising an anti-reflective property.

11. The method of claim 7, further comprising forming the conductive layer disposed outwardly from the substrate.

12. The method of claim 7, further comprising enabling a conductive path around the periphery of the conductive layer.

13. The method of claim 12, wherein enabling the conductive path around the periphery of the conductive layer comprises:
    forming a plurality of interconnected conductive conduits within the conductive layer; and
    wherein the combination of the plurality of interconnected conductive conduits form the conductive path for routing the bias voltage substantially inwardly from the periphery of the micro-mirror.

14. The method of claim 13, wherein forming the interconnected conductive conduits comprises forming a plurality of channels, each of the plurality of channels interconnect at least two of the plurality of conductive conduits.

15. An apparatus for use with a digital micro-mirror, comprising:
    a hinge disposed outwardly from a substrate and capable of at least partially supporting a micro-mirror disposed outwardly from the hinge, the micro-mirror capable of being selectively transitioned between an on-state position and an off-state position based at least in part on a bias voltage received by a conductive conduit; and
    a conductive layer disposed inwardly from the at least one micro-mirror, wherein the conductive layer enables a conductive path for the bias voltage substantially inwardly from a periphery of the micro-mirror.

16. The apparatus of claim 15, wherein the substrate comprises a CMOS substrate.

17. The apparatus of claim 15, wherein the substrate comprises control circuitry capable of selectively transitioning the at least one micro-mirror between the on-state position and the off-state position.

18. The apparatus of claim 15, wherein the conductive layer comprises a plurality of interconnected conductive conduits and at least one hinge void, the hinge void disposed inwardly from the hinge.

19. The apparatus of claim 18, wherein the plurality of interconnected conductive conduits provide the conductive path for the bias voltage substantially inwardly from the periphery of the micro-mirror.

20. The apparatus of claim 18, wherein the conductive layer further comprises at least one channel interconnecting at least two of the plurality of conductive conduits.

* * * * *